Jan. 11, 1966  R. W. BROWN  3,228,458
CONTROL APPARATUS
Filed June 17, 1963
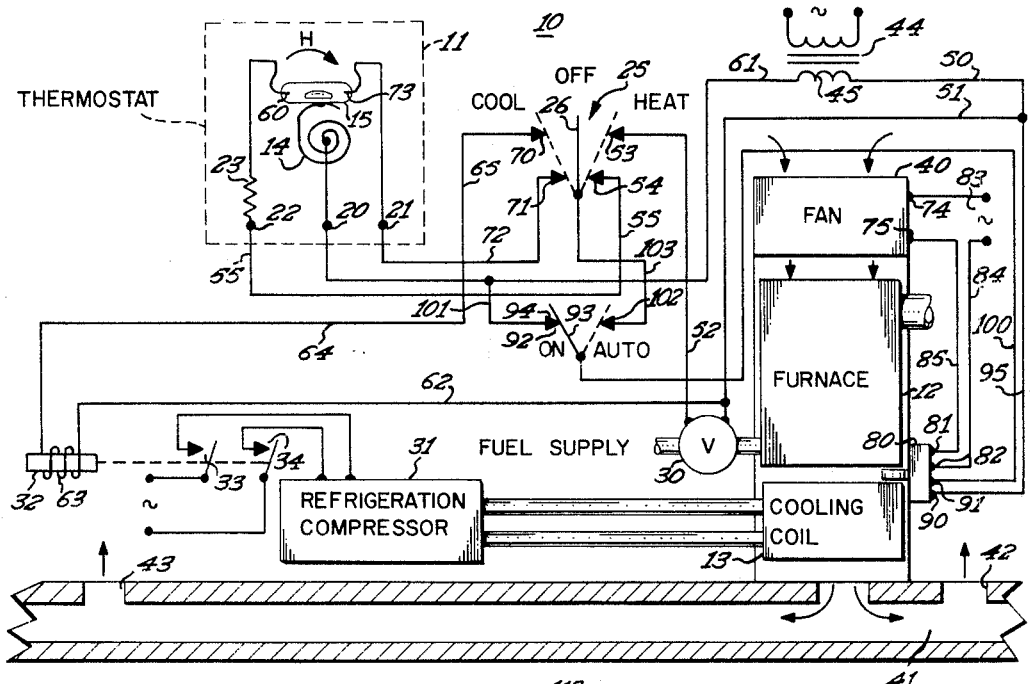
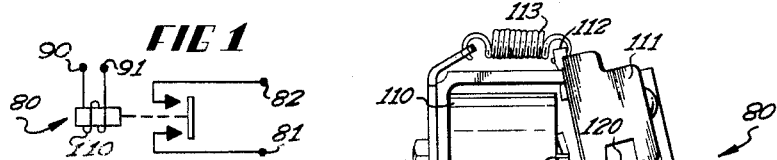
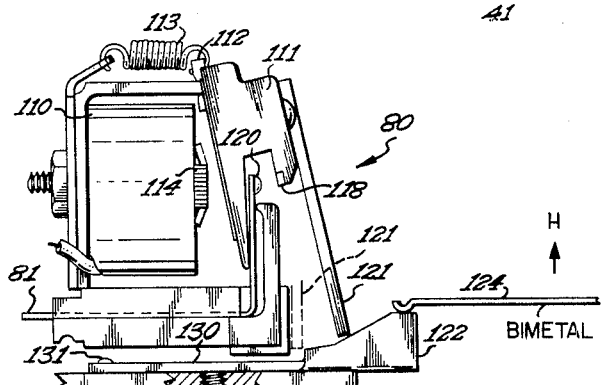
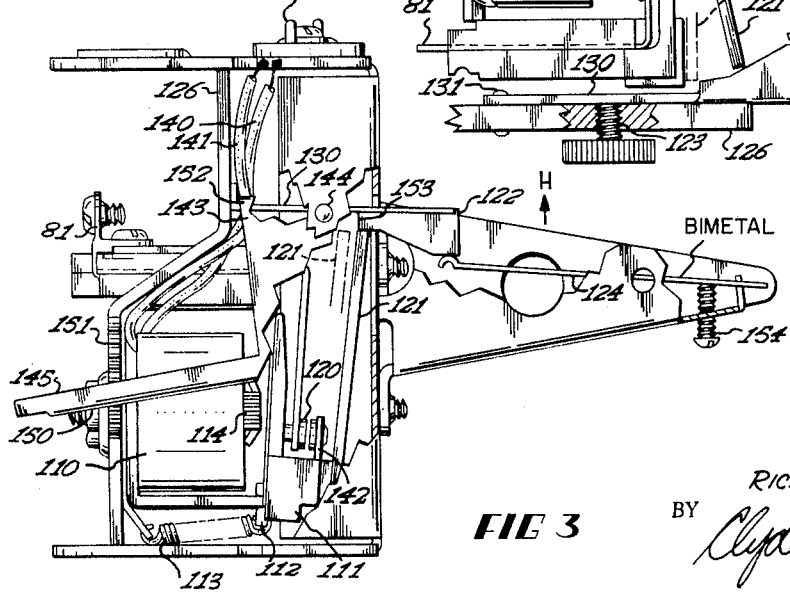
INVENTOR.
RICHARD W. BROWN
BY Clyde L. Blinn
ATTORNEY

United States Patent Office 3,228,458
Patented Jan. 11, 1966

3,228,458
CONTROL APPARATUS
Richard W. Brown, Excelsior, Minn., assignor to Honeywell Inc., a corporation of Delaware
Filed June 17, 1963, Ser. No. 288,365
3 Claims. (Cl. 165—26)

The present invention is concerned with an improved fan control system; in particular, the fan control system is for use in air-conditioning apparatus for heating and cooling wherein during the heating operation an "instant on-temperature off" control of the fan is desired and during the cooling operation an "instant on-instant off" control of the fan is desired.

With the use of cooling apparatus in a furnace to provide both heating and cooling of air delivered to a space, certain requirements of the combined system has heretofore resulted in a plurality of control circuits for the fan resulting in a duplication of control devices. For example, in a counterflow furnace where the air exhausts from the lower portion of the furnace to be returned at the top of the furnace, some means is needed to start the fan motor without depending the air temperature in the furnace. A common manner of doing this is to energize the fan control relay directly from the space thermostat at the same time that the fuel supply or burner is energized. To prevent the loss of the heat in the furnace which remains after the burner is de-energized, an air temperature or bonnet temperature responsive switch is used to maintain energization of the fan motor until the furnace is cooled down. In a downdraft furnace, a temperature responsive fan relay can be mounted in the lower portion of the furnace. Since the warm air upon the initial energization of the furnace would tend to rise upward, the fan relay can be directly energized by the thermostat to initiate the downward flow of air by the fan. After the thermostat is satisfied, the fan is maintained energized until the air temperature in the lower portion of the furnace drops. When cooling apparatus is used in combination with the heating apparatus is such a counterflow furnace, generally, a separate fan control is used to bring about the energization of the fan only during the period of energization of the cooling apparatus.

The present invention recognizes that a combined use can be made of a fan control in both a heating and cooling system for a furnace to provide the "instant on-temperature off" operation during heating and the "instant on-instant off" operation during cooling.

An object of the present invention is to provide an improved fan control system for a temperature conditioning apparatus providing heating and cooling with the "instant on-temperature off" operation during heating and "instant on-instant off" operation during cooling.

This and other objects of the present invention will become apparent upon a study of the following specification and drawing of which FIGURE 1 is a schematic view of the downdraft heating and cooling system providing the fan control operation.

FIGURE 2 is one embodiment of the present invention showing the electrically operated switch with the temperature responsive latch means for use in the fan control system of FIGURE 1.

FIGURE 3 is another embodiment of the present invention showing an adjustable control point for the temperature responsive latch means used with the electrically operated switch actuator.

FIGURE 4 is a schematic electrical circuit of the fan controller 80.

These and other objects of the present invention will become apparent upon the study of the following specification and drawing.

Referring to FIGURE 1, space 10 has a thermostat 11 for controlling a conventional heating apparatus for furnace 12 and a cooling apparatus or heating exchanger 13. Thermostat 11 contains a bimetal 14 and a double ended mercury switch 15. When switch 15 moves in a clockwise direction, a circuit is closed between terminals 20 and 21, and when switch 15 is moved in a counterclockwise direction a circuit is closed between terminal 20 and a terminal 22. A heater 23 connected in the last mentioned circuit is provided for supplying heat to artificially cycle the thermostat for "heat anticipation" purposes. A system switch 25 provides for selection of heating or cooling when lever 26 is moved from the center position to either the left or right position shown in dotted lines.

Furnace 12 which is shown as an example as a downdraft type is supplied with fuel from a fuel supply when a valve 30 is energized. Cooling coil 13 is supplied with refrigerant from a refrigeration compressor 31 which is energized when a relay 32 closes switches 33 and 34. The compressor is of a conventional type as shown in the Newton Patent 2,214,700. Mounted above the furnace 12 and cooling coil 13 is a fan 40 for directing air downward over the heating and cooling heat exchangers into the supply duct 41 for supplying air to the space from outlets 42 and 43. The return of air from space 10 is at the top of the furnace into the fan 40.

A source of power or step-down transformer 44 has a secondary winding 45 for controlling relay 32 and valve 30 upon the operation of thermostat 11. The circuit for energizing valve 30 when thermostat 11 calls for heat is traced as follows: from secondary 45, a conductor 50, a conductor 51, valve 30, a conductor 52, contact 53 of the heat-cool switch, member 26, contact 54, conductor 55, terminal 22, heater 23, a heating switch 60 of switch 15, terminal 20, and back to the other side of the source of power through conductor 61. As the current flows through heater 23, artificial heat will be supplied to thermostat 11 to satisfy the thermostat by heating bimetal 14 to cause the thermostat to cycle for "heat anticipation" purposes. When member 26 is thrown to the left hand position for the cooling operation, relay 32 is energized to a circuit traced as follows: from secondary 45, a conductor 50, conductor 51, a conductor 62, a winding 63 of relay 32, a conductor 64, a conductor 65, contact 70, member 26, contact 71, a conductor 72, terminal 21, a cooling contact 73 of switch 15, terminal 20, and back to the other side of the source of power through conductor 61. As the cooling switch 73 closes and opens, relay 32 is effective to energize the refrigeration compressor 31 to provide cooling of the air passing through cooling unit 13.

The fan motor for fan 40 is energized when power is supplied to terminals 74 and 75. A fan control relay 80 has a pair of terminals 81 and 82 connected to a switch which when closed energizes the fan motor through a circuit traced as follows: from a source of power 83, a conductor 84, terminal 82, terminal 81, a conductor 85, fan terminal 75, terminal 74, and back to the other side of the source of power 83. Terminals 90 and 91 of the fan control 80 are connected to the energization winding 110. The energization winding is connected into the system to provide for either continuous operation of the fan or automatic operation of the fan depending upon the position of a fan switch 92. When a movable member 93 of the fan switch 92 is in the left hand position to engage contact 94, continuous energization of the fan is provided whether either the heating or cooling apparatus is energized by thermostat 11. When member 93 engages contact 102, a circuit is provided to provide for energization of fan 40 when the cooling or heating apparatus is energized.

The fan controller 80 is shown more specifically in FIGURE 2 and FIGURE 4. Energization winding 110 has the terminals 90 and 91 (not shown) to which power can be supplied. Upon the energization of winding 110, a switch operator 111, which is pivotally supported at its upper end on a hinge 112 and is spring biased in an outward or switch open position by a spring 113, is moved to the left against the armature 114 of winding 110. A pair of contacts 119 and 120 (contact 120 is not shown) are engaged by a shorting bar 118 to close the circuit. The circuit of contacts 119 and 120 is that of terminals of 81 and 82 (82 is not shown in FIGURE 2) which are shown in FIGURE 1.

A latch member 121 which is rigidly attached to member 111 moves in a clockwise direction to a position shown by dotted lines when winding 110 is energized. A latch 122 which can be adjusted by an adjustment screw 123 in base 126 is held downward by a temperature responsive device or bimetal 124. Bimetal 124 responds to the temperature of the air in the furnace. As the furnace air warms up, bimetal 124 moves upward to allow latch 122 to move in a position behind member 121. When winding 110 is de-energized, the switch actuator or member 111 can not move to an out position as long as latch 122 is not depressed downward by bimetal 124 as shown.

When the apparatus of FIGURE 2 is explained as used in the system of FIGURE 1, the operation of the fan controller is as follows: by the adjustment of screw 123, latch 122 can be biased upward since the narrow portion 130 is made of spring material and is attached by a fastening means 131 at the left-hand end. Even though bimetal 124 holds the right end of latch 122 downward, screw 123 can be advanced upward to place a bias on latch 122 whereby when the latch is freed from the force of the bimetal, the latch member 122 will assume a position to hold member 121 in the dotted position after the relay is energized. Assuming that the furnace 12 of FIGURE 1 had been de-energized and the air in the unit was cold. Upon a call for heat by switch 60, valve 30 is energized and winding 110 of the fan control shown in FIGURE 2 is energized. Member 111 moves in a clockwise direction and shorting bar 119 jumpers the contacts to connect a circuit between terminals 81 and 82 to energize the fan 40. As long as winding 110 remains energized, latch 122 is of no importance, and until the temperature in the furnace begins to increase to move bimetal 124 upward, the latch is held in a depressed position as shown in FIGURE 2. As soon as the temperature of the furnace increased and the downward flow of the warm air warmed bimetal 124 of the fan control, latch 122 moves upward behind the member 121. Upon the termination of the heating cycle by the satisfaction of thermostat 11, switch 60 opens to de-energize valve 30 and the fan control or winding 110. Member 111 is no longer attracted against the armature 114, but since latch 122 had moved upward from the position shown, member 121 is held in a switch closing position to maintain the fan energized. The fan remains energized until the air temperature of the furnace decreases which would only take place after all the residual heat of the furnace was removed to allow bimetal 124 to move downward and move latch 122 out of the holding position so that member 121 and 111 could move to the right to the position as shown.

For cooling operation, with the heat-cool switch 25 in the cool position, the compressor 31 is energized when switch 73 of the thermostat closes. Upon the energization of the compressor, winding 110 of the fan controller is also energized to bring about the operation of the fan in the normal manner. Since the air temperature of bimetal 124 never increases during the cooling operation, latch member 122 is held in the downward position as shown whereby upon the termination of the cooling operation, member 111 moves away from the armature 114 to the position as shown to de-energize the switch immediately upon the satisfaction of the thermostat 11.

With the operation explained, the fan controller of FIGURE 2 produces an "instant on-temperature off" operation for the heating operation of FIGURE 1 and an "instant on-instant off" operation of the fan during the cooling operation of the system of FIGURE 1.

Another embodiment of fan controller 80 is shown in FIGURE 3. Terminal 90 and 91 (91 not shown) on the upper side of the housing of the controller are connected by wires 140 and 141 to the energization winding 110. Upon the energization of winding 110, member 111 is moved in a clockwise direction against the armature 114. Contact 120 which is connected to terminal 81 is engaged by a movable contact 142 which is attached to member 111. Contact 142 is connected to a second terminal 82 (not shown) by a conventional flexible lead to provide a closed circuit between terminal 81 and 82 when winding 110 is energized. Latch member 121 is attached to member 111 to be moved to the position shown in dotted lines when the member 111 moves to the left against the armature 114. Latch 122 has the left end of the narrow portion 130 fastened to the base 126 so that the right-hand end of the latch member can move upward and downward depending upon the position of bimetal 124. A bias is provided on the narrow portion 130 of the latch member by means of a pivoted lever 143 pivoted on a shaft 144. An adjusting arm 145 of a pivoted lever 143 has an edge 150 which engages a knurled surface 151 of base 126 to hold the arm in a position once selected. By moving arm 145 downward, an upper extension of member 143 engages the narrow portion 130 of the latch member to bias the latch member downward by an amount depending upon the position of arm 145. Bimetal 124 supports latch member 122 so edge 153 of the member cannot engage member 121. By the calibration of bimetal 124 with adjusting screw 154, the temperature at which the fan control will de-energize the fan can be selected.

When the controller of FIGURE 3 is used in the system as shown in FIGURE 1, winding 110 is energized upon a call for heat when switch 60 closed and the system switch was in the heat position as shown by the dotted line to the right. Upon the energization of winding 110, member 111 is moved against the armature 114 and member 121 moves to the position shown by the dotted lines. Since the temperature of the air in the furnace is still low, latch 122 is held in the position as shown even though the force of the bias member 152 is pushing down on the narrow portion 130. As the temperature of the furnace increases and the warm air moves downward through the furnace to warm up bimetal 124, latch member 122 is allowed to drop; so that, the edge 152 moves behind member 121. Since the thermostat is still calling for heat and winding 110 is energized, the effect of the latch member does not change the operation. When thermostat 11 becomes satisfied, winding 110 is de-energized, but since latch 122 is holding member 121, member 111 cannot move to the right in the position as shown to open the fan switch and contacts 120 and 142 remain closed. As soon as the temperature of the air in the furnace decreases by the removal of the residual heat, bimetal 124 cools and moves upward to lift the latch 122 and allow member 121 to move to the right as shown. The fan switch contacts 120 and 142 move apart and the fan 40 of FIGURE 1 is de-energized.

During the cooling operation of FIGURE 1 with the cooling switch 25 shown in the dotted position in the far left, the closure of switch 73 energizes the compressor and the winding 110. Since the temperature of the furnace never rises against the temperature needed to move bimetal 124 and allow latch 122 to drop, the controller operates in a manner similar to a regular relay where the switch 120–142 is closed and opened immediately upon the energization or de-energization of winding 110. In this manner, the fan control of FIGURE 3 operates in the system as shown in FIGURE 1 to provide an "instant on-temperature off" operation during the heating cycle and an "instant on-instant off" operation of the fan during the cooling cycle.

While the invention has been described in a particular manner with the two embodiments, the intention is to limit the scope of the invention only by the scope of the appended claims of which I claim:

1. In a temperature control system for an air conditioning apparatus having a first heat exchanger for heating air and a second heat exchanger for cooling air and a fan for forcing air in thermal contact with said first and second exchangers to be conditioned before delivery to the space, a space thermostat, a system switch having a heating position and a cooling position, circuit means including said switch when in said heating position of connecting said thermostat to control the operation of said first heat exchanger, further circuit means including said switch when in said cooling position for connecting said thermostat to control the operation of said second heat exchanger, a fan control relay, a source of power, circuit means including said fan relay for connecting said fan to said source, said fan control relay having an energization winding and a temperature responsive latch means responsive to the temperature of the air leaving said exchangers for holding said relay in a circuit closed position once said relay is energized when the air is above a predetermined temperature, and circuit means for connecting said energization winding to said source when said thermostat closes to bring about operation of either of said heat exchangers whereby upon the operation of said first exchanger for heating said fan is de-energized when the temperature of the air from said first heat exchanger drops below said predetermined value to keep said fan in operation after said first exchanger operation is terminated; however, upon the operation of said second heat exchanger for cooling said fan is de-energized simultaneously with the termination of operation of said cooling exchanger.

2. In a temperature control system for an air conditioning apparatus having an air heating means an an air cooling means, a fan for forcing air in thermal contact with said first and second means to be conditioned before delivery to the space, a space thermostat, circuit means for connecting said thermostat to control the operation of said first heat exchanger, further circuit means for connecting said thermostat to control the operation of said second heat exchanger, a fan control relay, a source of power, circuit means including said fan relay for connecting said fan to said source, said fan control relay having an energization winding and a temperature responsive latch means responsive to a predetermined temperature of the air leaving said exchangers for holding said relay in a circuit closed position once said relay is energized when the air temperature is above a selected value, circuit means for connecting said energization winding to said source when said thermostat closes to bring about operation of either of said heat exchangers whereby upon the operation of said first exchanger for heating said fan is controlled in an "instant on-temperature off" manner; however, upon the operation of said second heat exchanger for cooling said fan is controlled in an "instant on-instant off" manner.

3. In a fan control system for an air conditioning system having heating and cooling apparatuses and a fan for forcing air through the apparatuses, a space thermostat for selectively controlling one or another of the heating and cooling apparatus, a fan control having a relay for energizing the fan when said relay is energized, circuit means including said thermostat for energizing said relay upon a call for either heating or cooling, air temperature responsive means responsive to the temperature of the air leaving said system, and means connecting said last mentioned means to said relay to maintain said relay in an energized position if the air temperature of said leaving air is above a predetermined value whereby said fan is simultaneously de-energized with said cooling apparatus since said leaving air is below said predetermined temperature and remains energized after said heating apparatus is de-energized until said leaving air temperature drops to said predetermined value.

References Cited by the Examiner
UNITED STATES PATENTS

| 2,155,256 | 4/1939 | Crago | 165—27 |
| 2,467,425 | 4/1949 | Cobb | 219—364 |
| 2,492,774 | 12/1949 | Wild | 219—364 |

ROBERT A. O'LEARY, *Primary Examiner.*

CHARLES SUKALO, *Examiner.*